Oct. 13, 1964
H. B. SCHULTZ
3,152,449
SERVOMOTOR ACTUATING MEANS
Filed Aug. 2, 1961
3 Sheets-Sheet 1
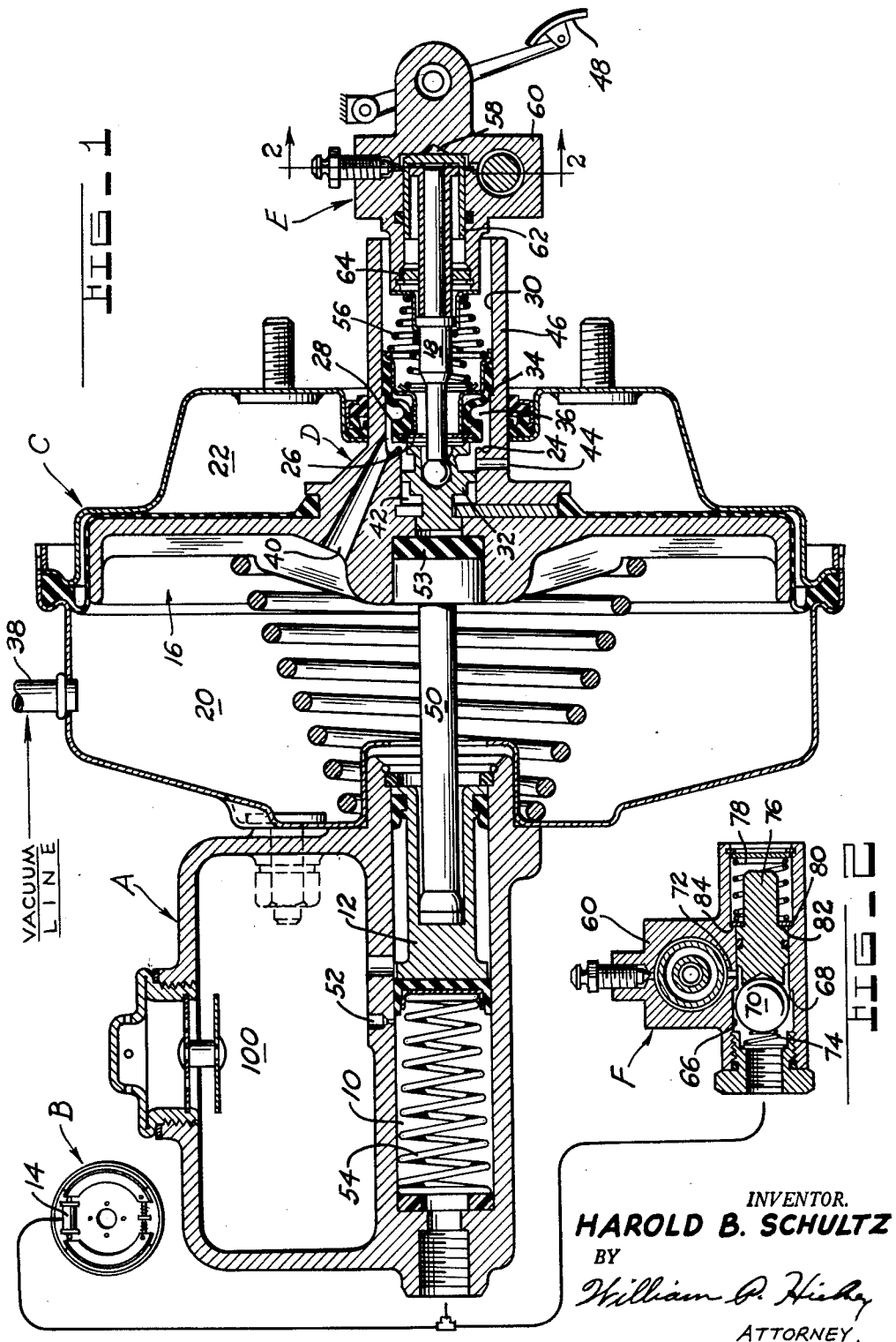
INVENTOR.
HAROLD B. SCHULTZ
BY
William P. Hickey
ATTORNEY.

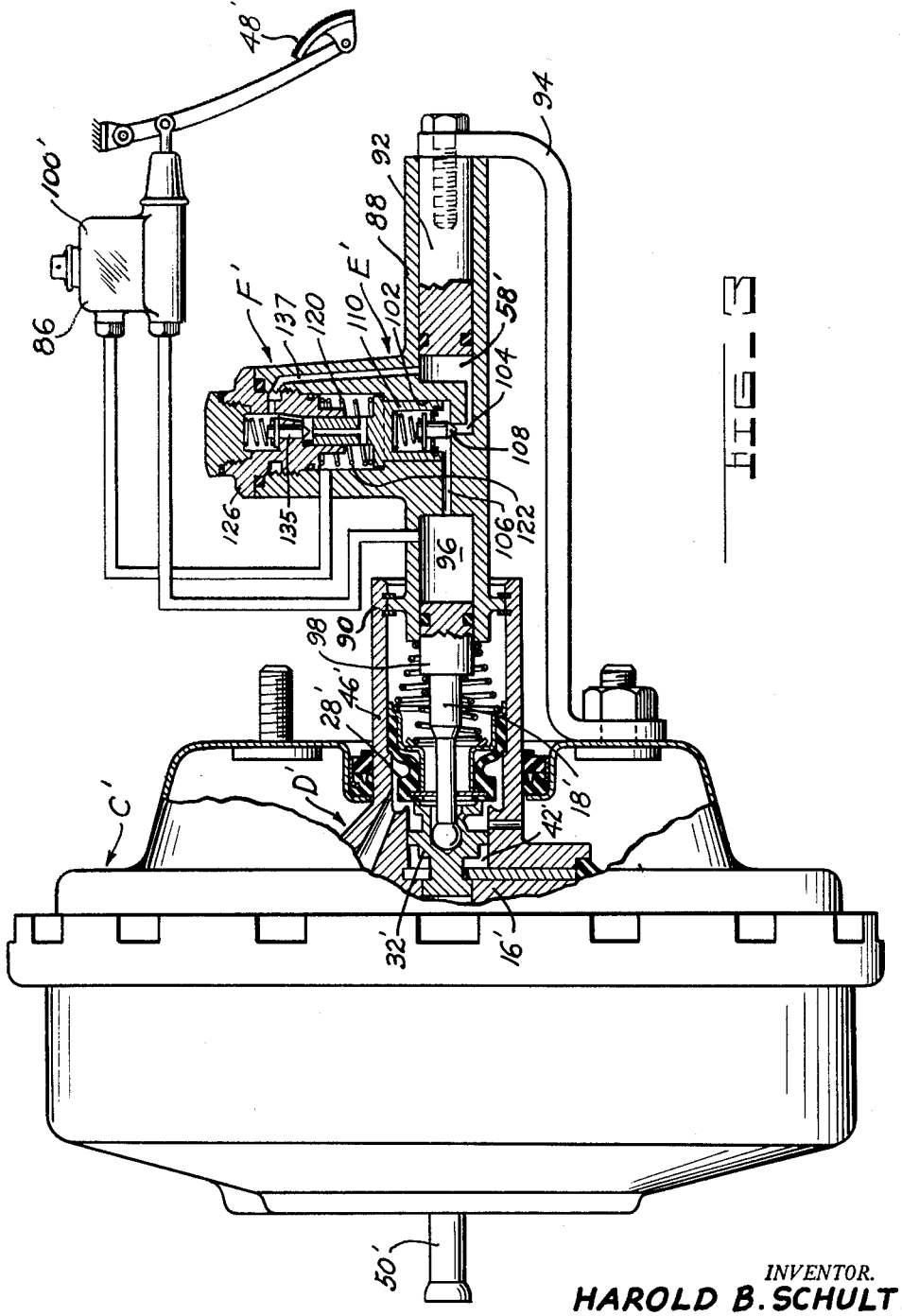

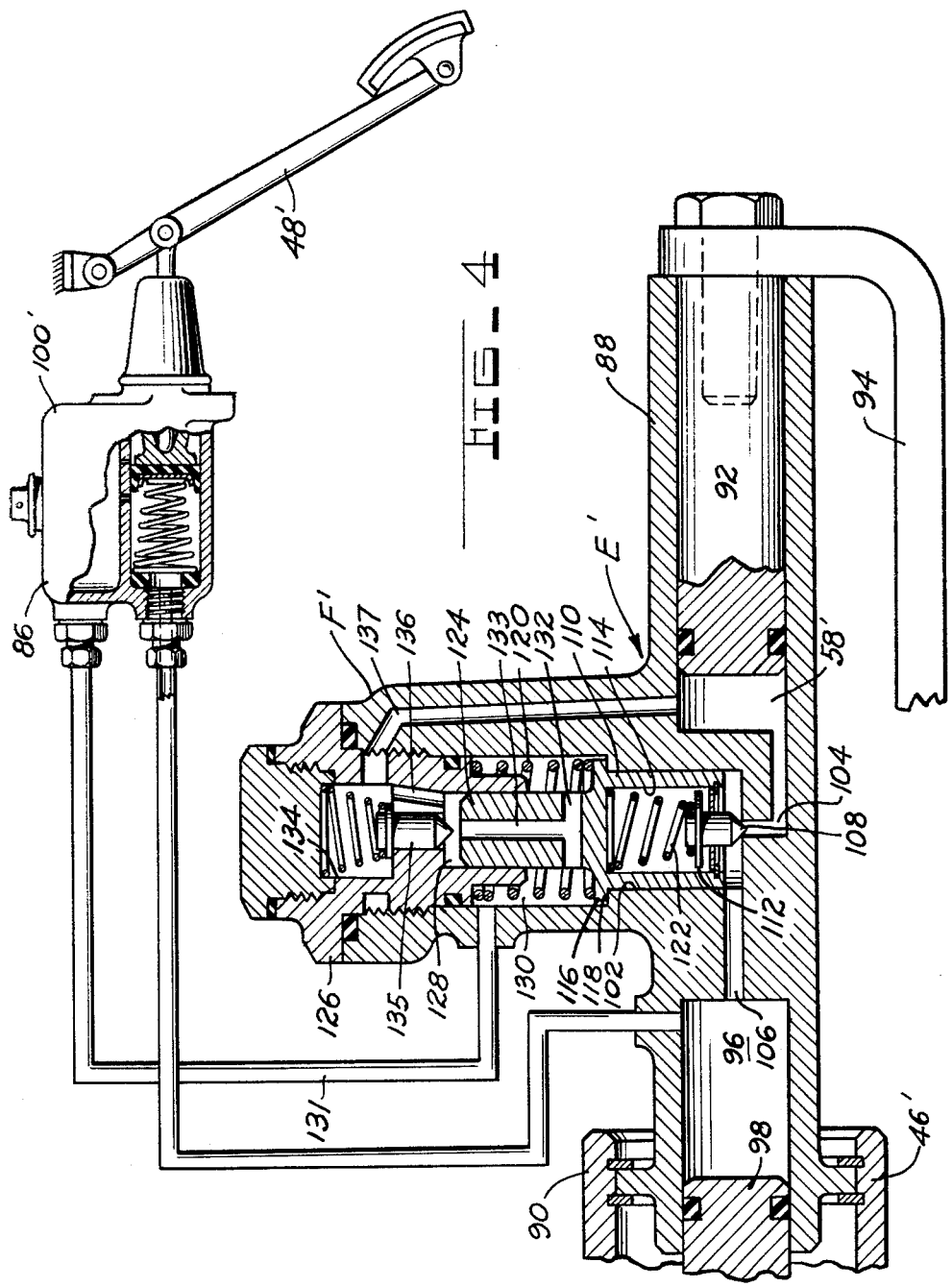

United States Patent Office 3,152,449
Patented Oct. 13, 1964

3,152,449
SERVOMOTOR ACTUATING MEANS
Harold B. Schultz, South Bend, Ind., assignor to The Bendix Corporation, South Bend, Ind., a corporation of Delaware
Filed Aug. 2, 1961, Ser. No. 128,720
7 Claims. (Cl. 60—54.5)

The present invention relates to actuating means for servomotors of the type carrying control structure on its movable power driven elements; and more particularly to actuating structures for the type of servomotor driven hydraulic master cylinders used to power actuate the hydraulic brakes of automotive vehicles.

The fluid pressure servomotors which are used to power actuate the hydraulic brakes of automotive vehicles generally include a control valve structure mounted on the power piston of the servomotor—which control valve is in turn actuated by means of a foot pedal lever. It is a property of the brake structures of the drum and shoe type, that a considerable amount of brake pedal lever movement is required to force the shoes out into engagement with the drums, and thereafter only a slight additional amount of foot pedal lever movement is required to produce the actual braking force. The brake operation therefore may be thought of as occurring in two stages: the first stage of which requires a large amount of fluid at low pressure to move the shoes into engagement with the drums; and the second stage of which requires a small amount of flow at a high pressure to produce the braking force. In most systems the transition between the stages occurs at a hydraulic pressure of approximately 100 p.s.i. In general, the servomotor driven master cylinders which are used to actuate these systems discharge fluid to the brake structures in an amount generally proportional to the movement of the controlling foot pedal lever. It has long been desired by the art to reduce the amount of foot pedal lever travel required to actuate such mechanisms to an amount which generally corresponds with that required to operate an accelerator pedal of an automotive vehicle.

An object of the present invention is therefore the provision of a new and improved servomotor structure controlled by a manually actuated member whose actuation will occur in two stages: the first of which produces a considerable movement of servomotor movement by means of a very small amount of movement of the manually actuated lever; and a second stage wherein the servomotor movement is generally directly proportional to the movement of the manually actuated member.

A more particular object of the present invention is the provision of a new and improved fluid pressure servomotor driven master cylinder of an automotive braking system wherein the shoes of the brake structures are forced out into engagement with their drums by the servomotor without requiring any substantial movement of the manually actuated member; and thereafter the manually actuated control member is caused to have a movement which is substantially directly proportional to the force applied between the brake shoes and brake drums.

A still further object of the present invention is the provision of a new and improved actuating mechanism for servomotors which can be interpositioned between a control structure mounted on the movable member of the servomotor, and a manually actuated control lever and wherein the connection expands during actuation of the servomotor to reduce the amount of follow-up movement of the servomotor's movable elements by the manually actuated control member.

The invention resides in certain constructions and combinations and arrangements of parts; and further objects and advantages will become apparent to those skilled in the art to which the invention relates from the following description of several preferred embodiments described with reference to the accompanying drawings forming a part of this specification, and in which:

FIGURE 1 is a schematic view of an automotive braking system in which its fluid pressure servomotor driven master cylinder and actuating mechanism is shown in section;

FIGURE 2 is a cross sectional view taken approximately on the line 2—2 of FIGURE 1;

FIGURE 3 is a fragmentary cross-sectional view showing another embodiment of fluid pressure servomotor and its actuating mechanism; and FIGURE 4 is a fragmentary enlarged view of the embodiment shown in FIGURE 3.

The automotive braking system shown in FIGURE 1 of the drawings generally comprises a conventional master cylinder A having a fluid pressurizing chamber 10 therein from which hydraulic fluid is forced by reason of the hydraulic piston 12 to the hydraulic motors 14, only one of which is shown, of a conventional drum and shoe type brake B. The piston 12 is adapted to be power driven by means of the movable wall or power piston 16 of a fluid pressure servomotor C attached to the master cylinder A. The control valve structure D for the servomotor C is mounted on and carried by the movable wall 16 of the servomotor; so that movement of the control rod 18 of the control valve structure D causes the movable wall 16 to move correspondingly. The servomotor C shown in the drawing is of the vacuum submerged type wherein vacuum of the same intensity is normally communicated to the front and rear power chambers 20 and 22 on the front and rear sides respectively, of the movable wall 16 during the normal energized condition shown in the drawing.

The control valve D shown in the drawings is of conventional construction and generally comprises a stationary vacuum valve seat 24, a concentric and movable vacuum atmospheric valve seat 26, and an annular poppet member 28 adapted to abut each of the valve seats. The valve structure is contained within an axially extending opening 30 which extends through the movable wall 16 and which is provided with a rearwardly facing step to provide a rearwardly facing shoulder which forms the vacuum valve seat 24. The atmospheric valve seat 26 is formed on the rear end of a movable valve control member 32 that is positioned in the opening 30 generally forwardly of the vacuum valve seat 24. The control rod 18 which is suitably attached to the control member 32 so as to be an operating part thereof controls the movement of the control member 32.

The annular poppet member 28 is formed of rubber and includes a front flange which is molded onto and around a suitable stiffening plate to effect a suitable seal with respect to both of the valve seats 24 and 26. The rear end of the poppet member 28 is provided with an integral flexible diaphragm portion which is suitably secured to the sidewalls of the opening 30 to effect a seal therewith. The annular area between the poppet member 28 and sidewalls of the opening 30 in the region between the vacuum valve seat 24 and the diaphragm portion 34 forms the vacuum chamber 36 of the valve. Vacuum is continually communicated to the vacuum chamber 36 through the vacuum inlet connection 38 to the chamber 20 and the vacuum passage 40 in the movable wall 16.

The region of the central opening 30 forwardly of the valve seats 24 and 26 forms the control chamber 42 of the valve, and is continually communicated to the rear opposing power chamber 22 by means of the radial passage 44. The central opening 30 extends externally of the housing of the servomotor through a tubular boss 46 which is suitably sealed with respect to the housing so that atmospheric pressure is continually communicated through the central opening in the annular poppet member 28 to the atmospheric valve seat 26.

The servomotor driven master cylinder structure above described is shown in FIGURE 1 in its normal deactivated condition wherein vacuum of the same intensity is communicated to both the forward and rearward power chambers 20 and 22 respectively, and no pressure is being supplied to the brake applying wheel cylinders 14. When it is desired to actuate the brakes, the control rod 18 is forced inwardly to cause the poppet member 28 to abut the vacuum valve seat 24 and close off vacuum communication with the rear opposing power chamber 22. Thereafter a slight further forward movement of control rod 18 moves the atmospheric valve seat 26 out of engagement with the poppet member 28, thereby causing air pressure to flow through the opening 30 to the rear opposing power chamber 22 and force the movable wall 16 forwardly. Movement of the movable wall 16 is transmitted through the push rod 50 to the piston 12 causing it to close off its compensating port 52 and thereafter force fluid to the brake applying wheel cylinders 14. A block of rubber 53 is positioned between the movable wall 16 and push rod 50 to provide a reaction force against the control member 32 which is generally proportional to the force applied to the push rod 50. When it is desired to prevent further increase in braking effort, forward movement of the control rod 18 is stopped; whereupon flow of air through the valve continues for a further instant until the movable wall 16 moves forwardly to allow the poppet member 28 to again engage the atmospheric valve seat 26. Thereafter all flow through the valve structure is stopped and the piston 12 remains in a stationary position. When it is desired to release the brakes, the control rod 18 is allowed to move rearwardly; whereupon the atmospheric valve seat 26 moves the poppet member 28 out of engagement with the vacuum valve seat 24 to communicate vacuum with the rear opposing power chamber 22. The resulting decrease in pressure differential across the movable wall 16 permits the hydraulic pressure in the chamber 10 plus the force of the piston return spring 54 to move the movable wall 16 rearwardly. The movable wall 16 will stop in any position in which the control rod 18 is held; and if it is desired to completely release the brakes, the removal of all force from the control rod 18 allows the spring 56 to hold the poppet member 28 out of engagement with the vacuum valve seat 24, so that the structure again assumes the position shown in the drawing. The general structure so far described is similar to that shown and described in the Robert R. Hager application 98,472, now Patent No. 3,053,235, and for a more complete understanding of its construction and operation reference may be had to that application.

Conventionally, control rod portion 18 of the control member 32 is actuated through mechanical means that is directly connected to the foot pedal lever 48 of the automotive vehicle on which it is mounted. Conventionally therefore the movable wall 16 is caused to assume a position corresponding with the position to which the foot pedal lever 48 is moved.

As previously indicated it is an object of the present invention to reduce the amount of pedal lever movement that is required to actuate the braking system—particularly during the time that the brake shoes are moving out of engagement with the brake drum, and during which a relatively large amount of fluid is required to force the shoes into engagement with the drums. This is accomplished in the embodiment shown in FIGURE 1, by means of an expansible or telescoping member E having a hydraulic chamber 58 positioned between its movable parts for causing an extension thereof. The structure E shown in FIGURE 1 has a body portion 60 having a forwardly facing hydraulic chamber 58 therein which is closed off by means of the hydraulic piston 62. The piston is suitably sealed with respect to the sidewalls of the chamber 58, and the control rod 18 is suitably fixed to the hydraulic piston 62 so that its movement is controlled thereby. The rear end of the body portion 60 is suitably pinned to the foot pedal lever 48. A suitable guide bearing 64 is interpositioned between the front end of the body portion 60 and control rod 18, so that the telescoping member E is suitably supported between the foot pedal lever 48 and the control member 32 to accommodate a slight amount of lateral movement.

Although the expansible member E may be caused to expand at various times during the actuation of the unit to produce various effects, it is shown in FIGURE 1 as being connected to the output of the fluid pressure chamber 10 of the master cylinder to receive fluid pressure therefrom. As the servomotor C is actuated therefore, gradually increasing pressure from the chamber 10 is communicated to the hydraulic chamber 58 to cause it to expand proportionately so that very little, if any, movement of the control foot pedal lever 48 is necessary. It has been chosen in the embodiment shown in FIGURE 1 to terminate the expansion of the member E at approximately the time that the brake shoes engage the brake drums. This occurs when the pressure in the discharge of the master cylinder A reaches a pressure of approximately 100 p.s.i.; by reason of a valve structure F which closes off communication between the master cylinder and the expansible chamber 58 at this time. The valve structure F can best be seen in FIGURE 2 of the drawings, and as shown, is formed in the body section 60 by means of a transverse passage or bore 66 beneath the expansible chamber 58. The bore 66 is provided with an outwardly facing shoulder 68 against which a ball valve 70 is adapted to seat and to shut-off flow from the master cylinder to the expansible chamber 58. Flow from the master cylinder enters the open end of the bore 66, and a small passageway 72 inwardly of the shoulders 68 communicates this flow to the expansible chamber 58. A coil spring 74 is provided to bias the ball 70 toward the valve seat 68, and the ball 70 is normally held out of engagement with the valve seat 68 by means of a hydraulic piston 76 that is positioned inwardly of the valve seat 68. A coil spring 78 biases the piston 76 to a position which holds the ball 70 out of engagement with the valve seat 68. The coil spring 78 works through a washer 80 which abuts a shoulder 82 on the piston member 76, and valve opening movement is limited by abutment of the washer 80 with another shoulder 84 in the opening 66. The spring 78 is normally compressed by an amount which holds the piston 76 in its valve opening position until a pressure of approximately 100 p.s.i. is asserted against the piston; whereupon the force of spring 78 is overcome and the piston moves to allow the ball 72 to abut the valve seat 68. Thereafter further expansion of the telescoping member E is prevented, and the foot pedal lever 48 moves in accord with the power member 16. Inasmuch as this occurs after the time that the brake shoes have engaged the brake drum, there is thereafter provided a movement of the foot pedal lever 48 which is indicative of the amount of braking effort being produced.

The embodiment of brake actuating system shown in FIGURE 3 of the drawings corresponds generally with that shown in FIGURE 1, and differs principally therefrom in the arrangement of expansible member E' which is used to actuate the control rod 18'. The structure shown in FIGURE 3 is intended to actuate a master cylinder A which is identical with that shown in FIGURE 1; and those portions of FIGURE 3 which are similar to corresponding portions in FIGURE 1 are designated by like numeral or letter, characterized further in that a prime mark is affixed thereto.

The expansible structure E' is a hydraulic equivalent of the general structure E shown in FIGURE 1 in that motion from the pedal lever 48' is transmitted to the control rod 18' by means of hydraulic displacement. The structure shown in FIGURE 3 generally comprises a conventional master cylinder 86, which may be identical to the master cylinder A shown in FIGURE 1, and which is actuated by means of the foot pedal lever 48'. In general the structure E' includes an expansible chamber 58' which is expanded during the initial stage of brake actuation without using any of the displacement from the master cylinder 86, until such time as the brake shoes engage the drums. Thereafter displacement from the master cylinder 86 is valved to the expansible chamber 58' so that movement of the foot pedal lever 48' then occurs in a manner proportional to the amount of braking effort which is achieved. The structure E' generally comprises a cast housing 88—the forward portion of which is suitably fixed as by snap rings 90 to the movable wall structure 16' of the fluid pressure motor C', and the rear portion of which is provided with an axially extending cylinder bore forming the expansible chamber 58'. A piston 92 closes off the rear end of the expansible chamber 58', and the piston 92 is held stationary by means of a bracket 94 which extends between the piston 92 and the shell of the servomotor structure C'. It will therefore be seen that movement of the power piston 16' causes an expansion of the expansible hydraulic chamber 58'.

The forward end of the cast housing 88 is also provided with an axially extending valve actuating bore 96 of substantially the same size as is the bore 58'. The bore 96 is closed off by means of a piston 98 which is shown at an integral part of the control rod 18'. Discharge from the master cylinder 86 is continually communicated to the valve actuating bore 96, so that pressure upon piston 98 causes an actuation of the servomotor C' which is directly proportional to the pressure generated in the master cylinder 86.

The structure shown in FIGURE 3 further includes a valve structure F' for controlling communication between the expansible chamber 58' and the low pressure reservoir 100' of the master cylinder 86. In the embodiment shown in FIGURE 3, communication is permitted up until such time as the pressure generated in the master cylinder 86 causes a pressure to be produced in the outlet of master cylinder A', not shown, of approximately 100 p.s.i. At this time, the valve structure F' is actuated to close off communication between the reservoir 100' and expansible chamber 58', and communicates the discharge of the master cylinder 86 to the expansible chamber 58' to provide a follow-up movement of the foot pedal lever 48'.

The valve structure F' is formed in the housing 88 by means of a vertical bore 102 having an outlet port in its inner end which communicates directly to the expansible chamber 58'. Adjacent the inner end of the vertical bore 102 there is provided a pressure inlet passage 106 which communicates pressure from the master cylinder 86 to the outlet passage 104. The outlet passage 104 is adapted to be closed off by means of a needle type poppet 108 which is yieldably carried by a piston 110 in the bore 102. The needle type poppet 108 has a cylindrical head 112 thereon which is slidingly received within a bore 114 in the bottom end of the piston 110. Downward movement of the piston 110 is limited by means of engagement of flange 116 on the piston 110 with a shoulder 118, and the piston is normally held in this position by means of a coil spring 120. A predetermined sealing force is provided for the poppet 108 by a coil spring 122 positioned between the poppet 108 and the bottom of the bore 114 and separation of the needle poppet 108 from the piston 110 is prevented by suitable snap ring means in the bore 114 beneath the cylindrical head 112 of the poppet 108.

The upper end of the piston 110 is provided with a tubular projecting portion 124, and the outer end of the bore 102 is closed off by a cap 126 having a bore 128 which slidingly receives the outer end of the tubular projection 124, and which bore 128 is always communicated to the expansible chamber 58'. The space 130 between the cap 126 and piston 110 is always communicated with the reservoir 100' by means of line 131. A drilled passage 132 through the tubular projection 124 is provided for communicating chamber 130 with the central opening 133 through the tubular projection 124. The cap member 126 further includes a stepped bore 134 communicating with bore 128 and having needle type poppet 135 therein which is yieldably biased into chamber 128 to a position spaced from the end of the tubular projection 124 when the flange 116 engages the shoulder 118. Upward movement of the tubular portion 124 causes it to abut the end of the needle poppet 135 to close off flow through the tubular projection 124. The portion of the bore 128 in the cap member 126 into which the tubular member 124 projects is communicated by means of a passage 136 to bore 134 and its passage 137 in the cast housing 88 leading to the expansible chamber 58'.

During the normal de-energized condition of the system therefore, the piston 110 engages the shoulder 118, passage 104 is closed off by the poppet 108, and the poppet 135 is out of engagement with the tubular projection 124 to permit flow of fluid from the reservoir 100' to the expansible chamber 58'. Depressing the foot pedal lever 48' builds up pressure within the master cylinder 86 which causes the piston 98 to move the control rod 18' and hence actuate the servomotor C' to force fluid out of its actuated master cylinder A', not shown. Movement of the movable wall 16' of the servomotor C' causes the housing 88 to move along with it; and inasmuch as the piston 92 is held stationary with respect to the housing of the servomotor C' by means of a suitable bracket 94, the expansible chamber 58' is caused to enlarge. Inasmuch as the poppet 135 is out of engagement with the tubular portion 124, low pressure fluid from the reservoir 100' is free to enter the expansible chamber 58' as it is expanded by the movable wall 16'. The only displacement therefore which is used from the master cylinder 86 during this initial stage of actuation, is that required to actuate the control valve structure D', and therefore substantially no movement of the foot pedal lever 48' takes place.

After a predetermined pressure has been developed by the master cylinder 86, the spring 120 yields to allow the piston 110 to move upwardly to sequentially close off the passage 137 through the tubular projection 124 from the expansible chamber 58', and thereafter left the poppet 108 out of sealing engagement with the seat surrounding passage 104, to communicate fluid discharge from the master cylinder 86 to the expansible chamber 58'. Thereafter any further actuation of the foot pedal lever 48' causes displacement of the master cylinder 86 to be used to enlarge the expansible chamber 58 so that there would be a movement of the foot pedal lever 48' generally corresponding to that of the movable wall 16' of the servomotor C'. In the preferred embodiment shown in the drawing, the spring 120 is preloaded to yield when the pressure from the master cylinder 86 produces a sufficient actuation of the servomotor C' to cause the shoes of the vehicle's brakes to engage their brake drums.

It will be apparent that the valve structure F' can be modified to cause different arrangements of follow-up movement of the movable wall 16' by the foot pedal lever 48'. Where for example, the valve structure F' is made to communicate with the master cylinder 86 to the expansible chamber 58' normally, and at a predetermined pressure close off communication between the expansible chamber 58' and the master cylinder 86, and in turn communicate it with the reservoir 100'; foot pedal lever movement would be provided initially, and would thereafter be prevented from exceeding a predetermined value. This arrangement can be used to provide brake operation at the time that the brake pedal lever would normally be bottomed out against the floor boards of the vehicle.

It will be apparent that the objects heretofore enumerated, as well as others, have been accomplished, and that there has been provided an actuating system for a servomotor of the follow-up type which prevents follow-up movement of the manually actuated lever during certain periods of actuation.

While the invention has been described in considerable detail, I do not wish to be limited to the particular construction shown and described; and it is my intention to cover hereby all novel adaptations, modifications and arrangements thereof which come within the practice of those skilled in the art to which the invention relates.

I claim:

1. In a servomotor driven hydraulic pressure developing system having a power driven movable structure on which the control member for the servomotor is mounted in such manner that movement of said control member in one direction causes said power driven structure to move in said direction and thereby cause said control member to follow the actuating movement of said power driven movable structure, said servomotor producing a reaction force on said control member in an opposite direction which is generally proportional to the force developed by its movable structure in said one direction, and said system including hydraulic pressurizing means which produces a hydraulic pressure generally proportional to the force which said servomotor develops: telescoping means having an internal variable volume chamber separating two expandable portions, a reaction means spaced from said control member, one portion of said telescoping means being operatively connected to said control member, and the other portion of said telescoping means being operatively connected to said reaction means and means communicating said hydraulic pressure of said hydraulic pressurizing means to said variable volume chamber to expand said portions during actuation of said servomotor and thereby permit the relative positions of said control member and said servomotor to change during actuation of said system.

2. In a servomotor driven hydraulic pressure developing system having a power driven movable structure on which the control member for the servomotor is mounted in such manner that movement of said control member in one direction causes said power driven structure to move in said direction and thereby cause said control member to follow the actuating movement of said power driven movable structure, said servomotor producing a reaction force on said control member in an opposite direction which is generally proportional to the force developed by its movable structure in said one direction, and said system including hydraulic pressurizing means which produces a hydraulic pressure generally proportional to the force which said servomotor develops: a telescoping means having an internal variable volume chamber separating two expandable portions, a reaction means spaced from said control member, one portion of said telescoping means being operatively connected to said control member, and the other portion of said telescoping means being operatively connected to said reaction means, means communicating said hydraulic pressure of said hydraulic pressurizing means to said variable volume chamber to expand said portions during actuation of said servomotor and thereby permit the relative positions of said control member and said servomotor to change during actuation of said system, and a regulating valve in said last mentioned means for regulating the flow of hydraulic fluid to said variable volume chamber.

3. In an actuating system for a servomotor having a power driven movable structure on which the control member for the servomotor is mounted in such manner that movement of said control member in one direction causes said power driven structure to move in said direction and thereby cause the control member to follow the actuating movement of said power driven structure: a manually actuated member, telescopic means operatively interpositioned between said manually actuated member and said control member for transmitting actuating force from said manually actuated member to said control member, said means having two telescopic parts forming an expansible hydraulic chamber which makes said means expandable, a collapsible hydraulic pressurizing chamber collapsed by said power driven structure to force hydraulic fluid therefrom, and flow communicating means communicating said collapsible chamber to said expandable chamber as said servomotor is actuated to decrease travel of said manually actuated member.

4. In an actuating system for a servomotor having a power driven movable structure on which the control member for the servomotor is mounted in such manner that movement of said control member in one direction causes said power driven structure to move in said direction and thereby cause the control member to follow the actuating movement of said power driven structure: a manually actuated member, telescopic means operatively interpositioned between said manually actuated member and said control member for transmitting actuating force from said manually actuated member to said control member, said means having telescopic parts forming an expansible hydraulic chamber which makes said means expandable, a collapsible hydraulic pressurizing chamber collapsed by said power driven structure to force hydraulic fluid therefrom, flow communicating means for communicating said collapsible chamber to said expandable chamber as said servomotor is actuated, and valve means for closing off said flow communicating means, said valve means being closed when the pressure generated in said collapsible chamber reaches a predetermined value.

5. In a servomotor including hydraulic pressurizing means according to claim 1 and further comprising a valve means for restricting flow through said means communicating hydraulic pressure to said variable volume chamber in accordance with a force applied to said control member to prevent failure of said telescoping means.

6. In a fluid pressure servomotor and the like:
   a housing having an internal axially extending chamber therein;
   a movable wall in said chamber, said movable wall having a generally cylindrically shaped boss axially extending through one end of said housing, said boss having an axially extending internal valve chamber therein which is stepped down in at least two successive stages to provide inner and outer shoulders facing axially outwardly of said valve chamber;
   an annular flexible poppet member having an inner thickened portion for engaging said inner shoulder, an outer portion having an interference fit with the side walls of said valve chamber, and an integral flexible portion interconnecting said inner and outer portions;
   a control member positioned axially inwardly of said poppet member and having an axially outwardly facing valve seat for engaging said poppet member radially inwardly of said inner shoulder and adapted for axial movement to sealingly engage said poppet member and disengage it from said inner shoulder;
   a control rod connected to said control member and projecting axially outwardly through said annular poppet member;
   a pivotally mounted foot pedal lever; and
   a telescoping member operatively connecting said foot pedal lever to said control rod with a variable volume chamber interposed therebetween.

7. In a fluid pressure servomotor and the like according to claim 6 and further comprising:
   a block of elastomeric material having an outer face seated against said inner shoulder;
   a force transmitting member slidably mounted in an opening in said movable wall and positioned adjacent an inner face of said block of elastomeric material;

a hydraulic pressurizing means operatively connected to said force transmitting member; and a means communicating a hydraulic pressure developed by said hydraulic pressurizing means to said variable volume chamber to expand said telescoping means during actuation of said servomotor and thereby permit the relative positions of said foot pedal lever and said control rod to change during actuation of said system.

References Cited in the file of this patent

UNITED STATES PATENTS

| | | |
|---|---|---|
| 2,275,697 | Stelzer | Mar. 10, 1942 |
| 2,440,654 | Elliott | Apr. 27, 1948 |
| 2,525,426 | Rockwell | Oct. 10, 1950 |
| 2,847,828 | Porter | Aug. 19, 1958 |
| 2,924,072 | Burwell | Feb. 9, 1960 |

UNITED STATES PATENT OFFICE
CERTIFICATE OF CORRECTION

Patent No. 3,152,449            October 13, 1964

Harold B. Schultz

It is hereby certified that error appears in the above numbered patent requiring correction and that the said Letters Patent should read as corrected below.

Column 6, line 46, for "left" read -- lift --; line 65, strike out "with".

Signed and sealed this 6th day of April 1965.

(SEAL)
Attest:

ERNEST W. SWIDER            EDWARD J. BRENNER
Attesting Officer            Commissioner of Patents